United States Patent
Sorgi et al.

(10) Patent No.: US 10,805,556 B1
(45) Date of Patent: Oct. 13, 2020

(54) STORAGE UNITS WITH SHIFTED-LENS CAMERAS

(71) Applicant: Amazon Technologies, Inc., Seattle, WA (US)

(72) Inventors: Lorenzo Sorgi, Seattle, WA (US); Paul Eugene Munger, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/254,258

(22) Filed: Jan. 22, 2019

(51) Int. Cl.
| | |
|---|---|
| *H04N 7/18* | (2006.01) |
| *H04N 5/247* | (2006.01) |
| *G06N 3/08* | (2006.01) |
| *G06N 20/00* | (2019.01) |
| *G06K 9/20* | (2006.01) |
| *H04N 5/225* | (2006.01) |
| *G06K 9/00* | (2006.01) |

(52) U.S. Cl.
CPC ......... *H04N 5/247* (2013.01); *G06K 9/00362* (2013.01); *G06K 9/00771* (2013.01); *G06K 9/209* (2013.01); *G06N 3/08* (2013.01); *G06N 20/00* (2019.01); *H04N 5/2253* (2013.01); *H04N 5/2254* (2013.01)

(58) Field of Classification Search
CPC .. H04N 5/247; H04N 5/2258; H04N 5/23296; G06N 20/00; G06K 9/00362; G06K 9/00771

See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Jonathan R Messmore
(74) *Attorney, Agent, or Firm* — Athorus, PLLC

(57) ABSTRACT

A shifted-lens imaging device mounted in association with a storage unit captures images of interactions by personnel with items on the storage unit. The images are processed to identify the items and/or the personnel, and to store an association of the personnel with the items in one or more data stores. The shifted-lens imaging device is mounted to the storage unit directly, such as by one or more extensions, and aligned to include a planar area of interest associated with the storage unit, such as a frontal area of the storage unit, within a field of view. A lens of the shifted-lens imaging device is shifted in parallel with the imaging sensor by an offset or distance that may be selected based on a focal length of the imaging device and a distance between the imaging device and dimensions of the planar area of interest.

20 Claims, 13 Drawing Sheets

(56) References Cited

U.S. PATENT DOCUMENTS

| | | |
|---|---|---|
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2014/0362223 A1 | 12/2014 | LaCroix et al. |
| 2015/0019391 A1 | 1/2015 | Kumar et al. |
| 2015/0073907 A1 | 3/2015 | Purves et al. |
| 2015/0310601 A1 | 10/2015 | Rodriguez et al. |
| 2016/0269629 A1* | 9/2016 | Martin ............... H04N 5/23238 |
| 2019/0086775 A1* | 3/2019 | DeMers ................ G03B 17/56 |
| 2019/0095717 A1* | 3/2019 | Calmus ............ G06K 9/00718 |
| 2019/0172039 A1* | 6/2019 | Kambara ............. G07G 1/0054 |
| 2019/0273849 A1* | 9/2019 | Schottner ............. H04N 5/2252 |
| 2019/0286892 A1* | 9/2019 | Li ............................ G06K 9/46 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

LENS SHIFTED FROM OPTICAL AXIS BY OFFSET S

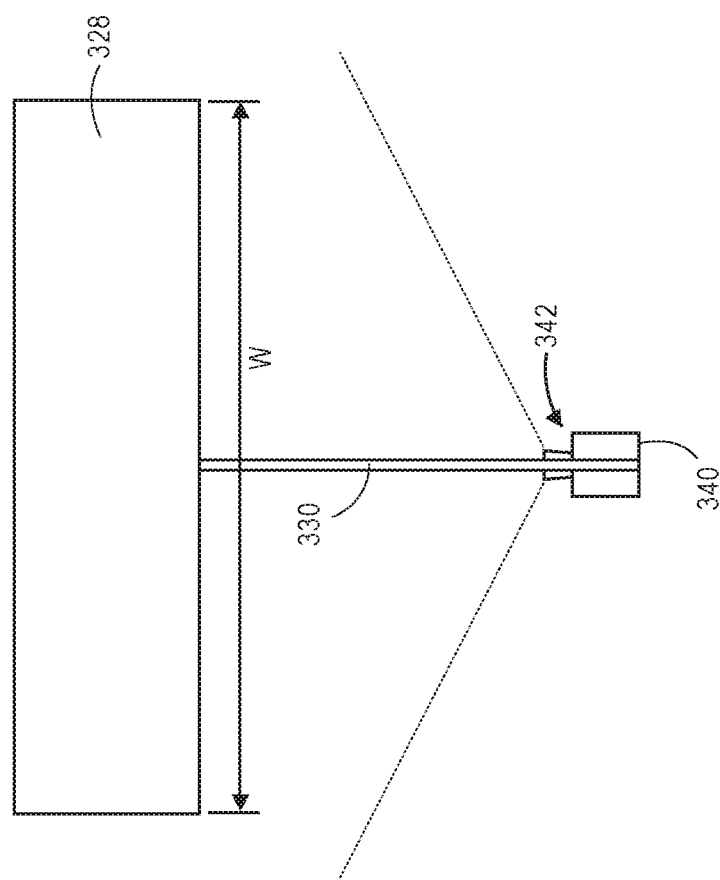

STORAGE UNITS WITH SHIFTED-LENS CAMERAS

BACKGROUND

Imaging devices, such as digital cameras, are frequently used in bricks-and-mortar commercial settings. In a materials handling facility, such as a retail store or establishment, a digital camera may be provided in one or more locations and configured to include portions of the materials handling facility within its field of view. Images captured by the digital camera may be processed to identify one or more customers or other personnel within the materials handling facility, to detect movements of such customers or personnel, or to identify items that are removed from storage units by such customers or personnel, or placed on such storage units by such customers or personnel.

Typically, imaging devices that are provided within a materials handling facility are mounted in elevated configurations, e.g., on ceilings or walls, in order to ensure that such imaging devices include accessible floor spaces, storage units or other areas within their respective fields of view, and to minimize a risk that the fields of view will be occluded. Where imaging devices are mounted in elevated configurations, however, images captured by such devices will be subjected to perspective distortions. For example, where an imaging device is mounted to a wall or ceiling above a storage unit, upper portions of the storage unit will appear larger and with greater clarity than lower portions of the storage unit.

BRIEF DESCRIPTION OF THE DRAWINGS

FIGS. 3A through 3D are views of aspects of one storage unit in accordance with implementations of the present disclosure.

DETAILED DESCRIPTION

As is set forth in greater detail below, the present disclosure is directed to storage units having imaging devices that are aligned to include frontal areas of interest associated with the storage units within their fields of view. The imaging devices may be mounted in association with the storage units, e.g., by coupling the imaging devices to the storage units directly by one or more extensions, or by mounting the imaging devices to include the frontal areas of the storage units within their respective fields of view, and may include lenses that are shifted in parallel with respect to an optical axis. The offsets or distances by which the lenses are shifted may be selected based on focal lengths of the imaging devices, distances between the imaging devices and the frontal areas, or dimensions of the frontal areas. By providing shifted-lens imaging devices in association with storage units, frontal areas of the storage units may appear consistently in imaging data captured using the imaging devices, and with a constant level of resolution. Moreover, imaging data captured using the imaging devices may be used to detect interactions with the storage units by one or more personnel (e.g., customers or workers), or to identify items or personnel associated with the one or more interactions.

Figure 1A:
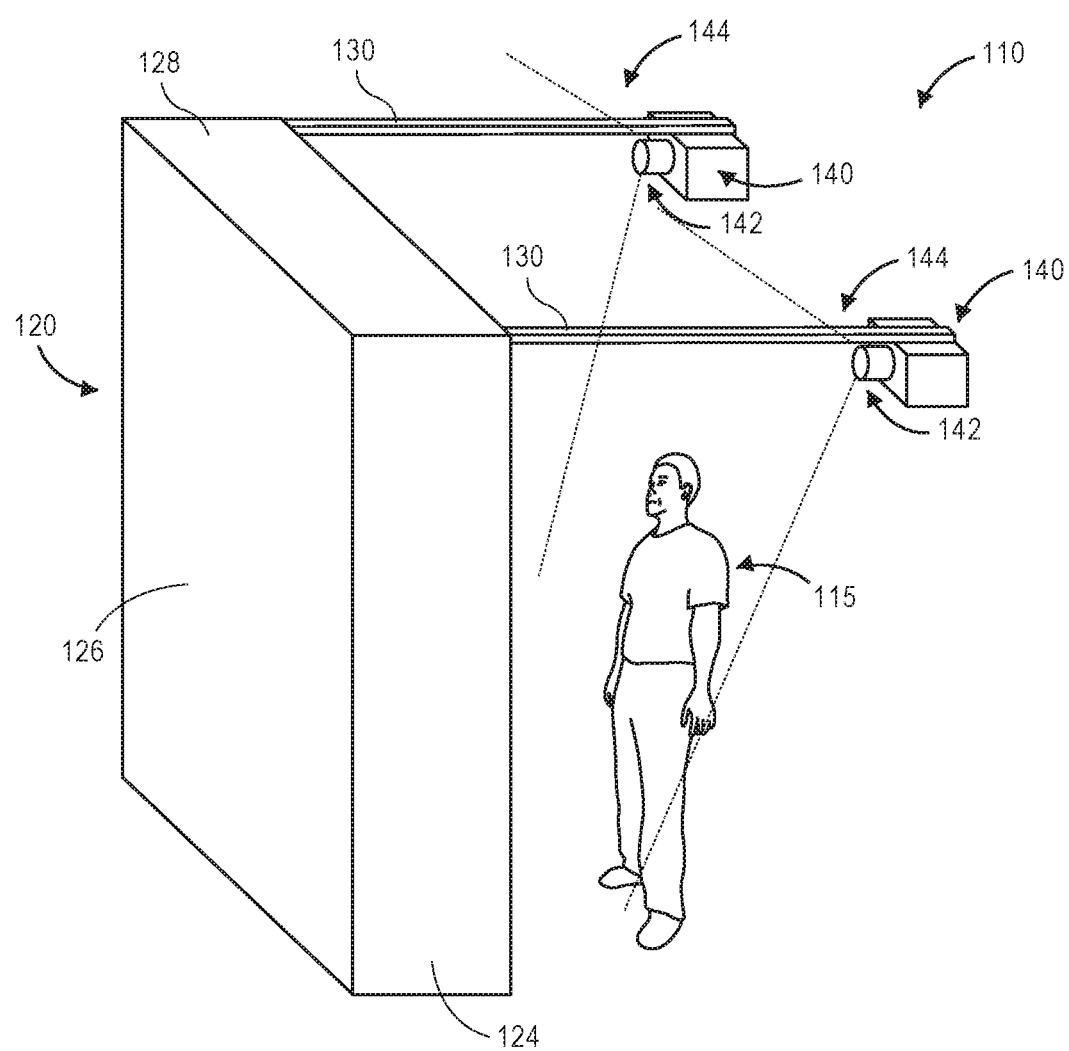
FIGS. 1A through 1E are views of aspects of one system in accordance with implementations of the present disclosure.
Figure 1B:
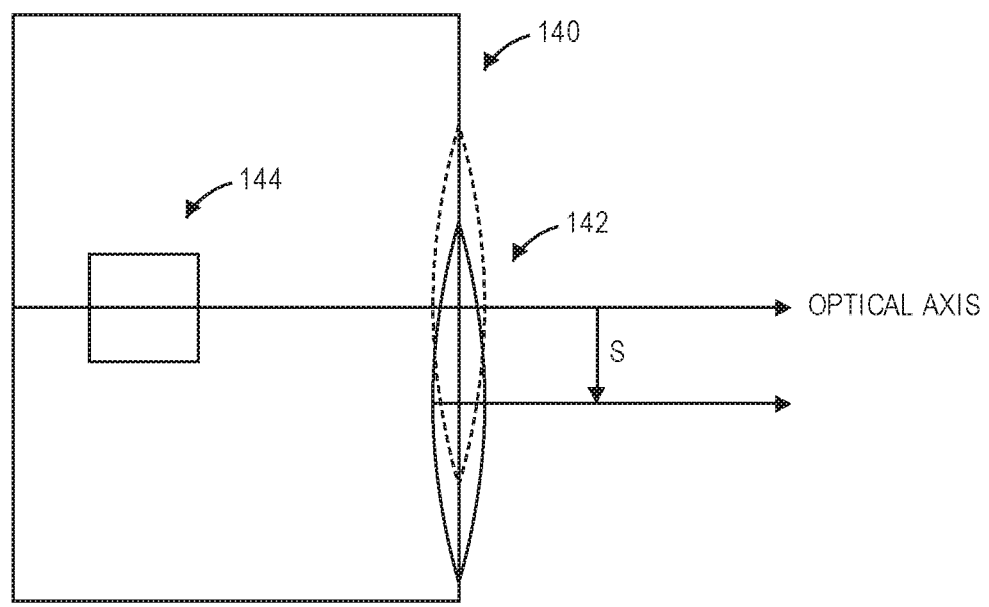
Figure 1C:
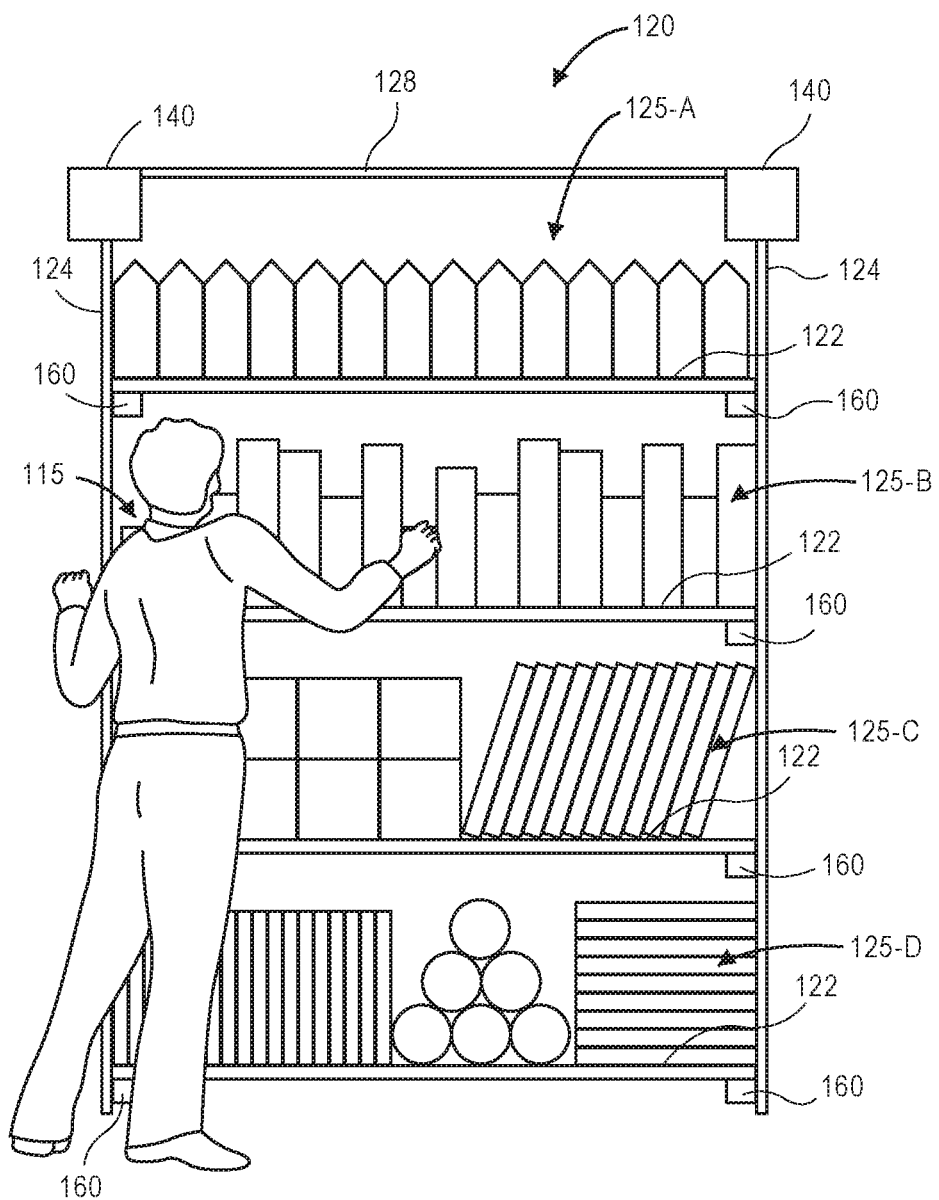

Referring to FIGS. 1A through 1E, views of aspects of one system in accordance with implementations of the present disclosure are shown. As is shown in FIGS. 1A and 1C, portions of a materials handling facility 110 including a storage unit 120 are shown. The storage unit 120 is in the form of a frame or other structure defined by a plurality of shelves 122 that are aligned horizontally or substantially horizontally, and in parallel to one another, and a pair of supports 124 that are aligned vertically or substantially vertically, also in parallel to one another. Alternatively, the supports 124 may be aligned horizontally or substantially horizontally, or at any other angle or orientation with respect to one another, and need not be aligned vertically or in parallel with one another. The storage unit 120 further includes a back panel 126 and a top panel 128.

The storage unit 120 also includes a pair of extensions (or supports) 130, each of which are extended laterally outward from the supports 124 and/or the top panel 128, e.g., substantially normal to the supports 124 or the top panel 128, and includes an imaging device 140 coupled to a distal end. The extensions 130 may be rods or other structures that provide support to the imaging devices 140, which have lenses 142 that are shifted with respect to optical axes of the imaging devices 140. The storage unit 120 may be a freestanding, independent unit, or a unit that is mounted or coupled to a wall or another structure.

One or more elements of the storage unit 120, including but not limited to the shelves 122, the supports 124, the back panel 126, the top panel 128 or the extensions 130, may be formed from any material of sufficient strength, rigidity or durability, including but not limited to wood (e.g., woods with sufficient strength properties such as ash), metals (e.g., lightweight metals such as aluminum, or metals of heavier weights including alloys of steel), plastics (e.g., thermosetting plastics such as epoxy or phenolic resins, polyurethanes or polyesters, as well as polyethylenes, polypropylenes or polyvinyl chlorides), composites or any other combinations of materials. Moreover, one or more of the shelves 122, the supports 124, the back panel 126, the top panel 128 or the extensions 130 may be solid, integral units (e.g., panels) or, alternatively, partially open units having lattice-like or truss-like structures.

Each of the shelves 122 may be mounted to the pair of supports 124 and/or to the back panel 126, or otherwise mounted in association with the storage unit 120 in any other manner. For example, the storage unit 120 may be a gondola-type system, with two-post shelves 122 that are cantilevered from the back panel 126, or with four-post shelves 122 that are supported by the supports 124, e.g., within a cabinet or like structure. Alternatively, in some implementations, the storage unit 120 may include one or more bays, slots, bins, tables, racks, tiers, bars, hooks, or cubbies, or other systems or components for storing one or more items, and need not include shelves.

As is shown in FIG. 1B, the lenses 142 of the imaging devices 140 are shifted from an optical axis defined by the optical sensors 144. In some implementations, the optical sensors 144 may include a visual sensor (e.g., color, grayscale or black-and-white sensor), a depth sensor or the like. For example, and as is shown in FIG. 1B, the lenses 142 may be shifted by an offset S, which may be selected on any basis. For example, the amount of the offset S may be selected as a function of the focal length of the imaging device 140, a distance between the lens 142 and a frontal area defined by the frame or other structure of the storage unit 120, or one or more dimensions of the frontal area. In some implementations, the sensors of the imaging devices 140 may include a plurality of photoreceptors or other pixel sensors that are arranged in an array, a grid or any other shape or arrangement and define an optical axis. Additionally, the imaging devices 140 may be calibrated, such that mappings between coordinates of imaging data captured by the imaging devices 140 and directions relative to their respective image sensors are known.

As is shown in FIG. 1C, each of the shelves 122 has a plurality of items 125-a, 125-b, 125-c, 125-d deposited thereon, and a load sensor 160 provided at either end. The load sensors 160 may be configured to sense loading on the shelves 122, or to detect changes in loading on the shelves 122. Where a customer 115 (or a worker or other personnel) interacts with one or more of the items 125-a, 125-b, 125-c, 125-d, such as by removing one of the items 125-a, 125-b, 125-c, 125-d from one of the shelves 122 or depositing one of the items 125-a, 125-b, 125-c, 125-d onto the shelves 122, changes in the loading on the one of the shelves 122 may be sensed by the load sensors 160. The arrangement of the imaging devices 140, as shown in FIGS. 1A and 1C, ensures that the frontal area of the storage unit 120 will be sufficiently covered by the fields of view of the imaging devices 140, with sufficient overlap. For example, the imaging devices 140 are positioned above and on either side of the storage unit 120, thereby ensuring that the frontal area of the storage unit 120 is visible to the imaging devices 140 from different perspectives, and with sufficient overlap, even where one or more personnel, such as the customer 115, are present between the imaging devices 140 and the frontal area of the storage unit 120. The frontal area of the storage unit 120 may be defined to include any planar area of interest in three-dimensional space, and may but need not be specifically defined to include or encompass any portion of the storage unit 120, e.g., the one or more shelves 122.

Figure 1E:
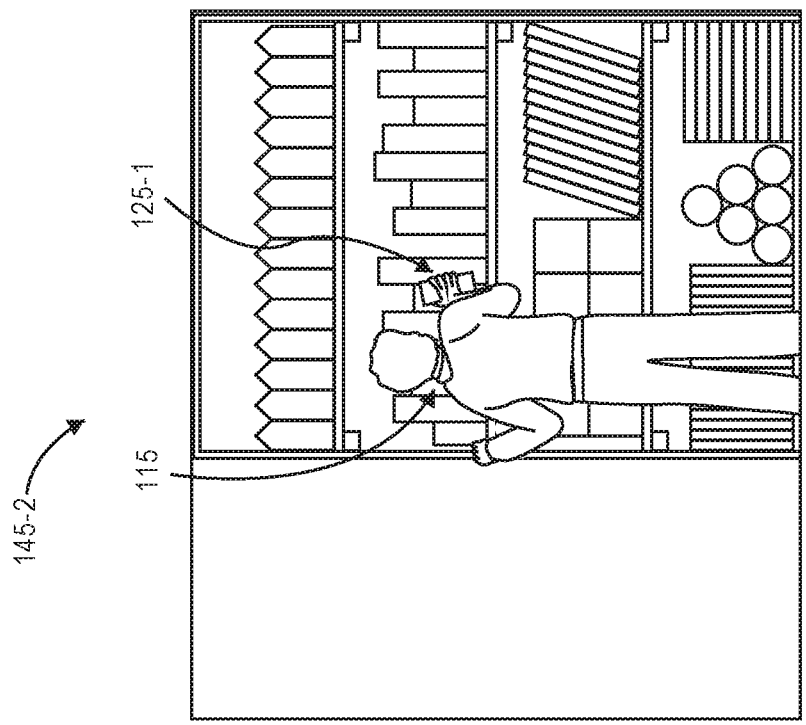
Figure 1D:
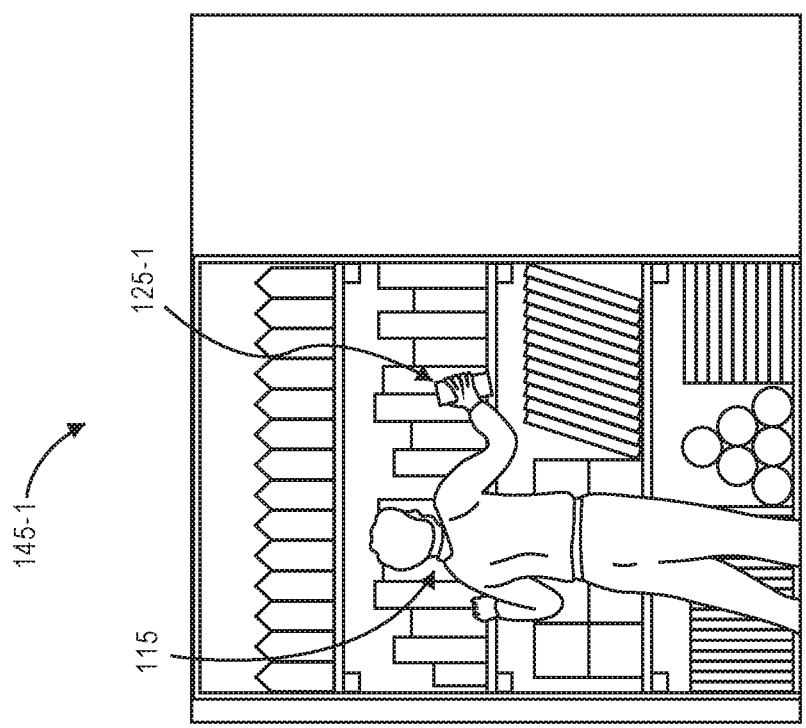

As is shown in FIGS. 1D and 1E, images 145-1, 145-2 captured by the imaging devices 140 depict the customer 115 interacting with one of the items 125-1. The images 145-1, 145-2 show the frontal area of the storage unit 120 in a similar fashion, e.g., without perspective distortion and with substantially identical levels of resolution. Because the imaging devices 140 are mounted in different locations with respect to the frontal area of the storage unit 120, the images 145-1, 145-2 further depict the customer 115 interacting with the one of the items 125-1 from different perspectives. Subsequently, the images 145-1, 145-2 may be processed, e.g., by one or more object detection or recognition algorithms or techniques that are trained or configured to detect colors, textures, outlines or other aspects or features of objects, such as aspects or features of one or more of the items 125-a, 125-b, 125-c, 125-d or body parts, segments or other aspects of customers, e.g., to identify the item 125-1 or the customer 115, or to associate the item 125-1 with the customer 115.

In accordance with implementations of the present disclosure, the item 125-1 or the customer 115 may be identified in any manner. In some implementations, each of the imaging devices 140 may process images (viz., the images 145-1, 145-2) respectively captured thereby, e.g., according to one or more machine learning tools or techniques. For example, one or more processors of each of the imaging devices 140 may be programmed or configured to execute one or more machine learning tools or techniques to detect one or more aspects of human actors or other objects, or to segment portions of imaging data that include the actors or objects. In some implementations, such processors may receive one or more of the images as inputs to such machine learning tools or techniques, and one or more aspects of the objects may be determined or predicted based on outputs received from the one or more machine learning tools or techniques. In some implementations, the imaging devices 140 may be configured to transmit the imaging data to one or more external computer devices or systems, which may be configured to execute one or more machine learning tools or techniques to detect one or more aspects of human actors or other objects, or to segment portions of imaging data that include the actors or objects, from the imaging data captured by one or more of the imaging devices 140.

Imaging devices, such as digital cameras, are commonly used in materials handling facilities such as retail establishments or warehouses to monitor items that are located on shelves or other storage units. Where a typical imaging device is utilized, selecting a location that optimizes the visual performance of the imaging device, e.g., by maximizing the visual acuity and minimizing the expected occlusions, is not an easy task.

The systems and methods of the present disclosure are directed to storage units or modules, such as sets of one or more racks of shelves, including one or more shifted-lens imaging devices mounted thereto or in association therewith. Where two or more imaging devices are utilized, such as is shown in FIGS. 1A and 1C, the imaging devices may be configured to maximize the coverage of the frontal viewing areas of the storage units with sufficient overlap. Moreover, in some implementations, each of the imaging devices includes a common level of visual acuity or resolution, and is configured to ensure that their respective focal planes are aligned with the frontal areas of the storage units.

A shifted-lens imaging device is an imaging device, such as a digital camera, having a lens that is shifted, parallel to the image plane, with respect to an optical axis. The shifting of the lens results in a shift in a direction of a center of an angle of view of the imaging device. As a result, imaging data captured using a shifted-lens imaging device may have reduced perspective distortion, particularly where subjects within a field of view of the imaging device have large fronto-parallel surfaces, such as buildings or frontal areas of storage units.

An amount of offset or shift of a lens within a shifted-lens imaging device may be selected in order to maximize the coverage of a frontal area of a storage unit. For example, using relationships of similar triangles, an amount of a shift of a lens of an imaging device may be selected based on a distance between the lens and an image sensor (e.g., a focal length), a distance between the lens and a storage unit, or dimensions (e.g., heights or widths) of the storage unit. Additionally, where two or more imaging devices are utilized, an amount of offset or shift of the lens may be selected in order to ensure that a sufficient overlap is obtained between the imaging devices.

Accordingly, the systems and methods of the present disclosure are directed to storage units with shifted-lens imaging devices that are easy to install, e.g., in fronto-parallel orientations with respect to frontal areas of the storage units, and in a manner that is easily dimensioned according to the geometry of the storage units. In some implementations, the orientation of the imaging devices with respect to the storage units may reduce or minimize the effects of occlusions, such as where a person or an item is along a line of sight between an imaging device and a storage unit. By mounting an imaging device above a storage unit, and with a decentered field of view, particularly where multiple imaging devices are mounted in tandem, reduces a probability that interactions with the storage unit will be occluded.

The imaging devices of the present disclosure may be configured to ensure that any planar area of interest associated with a storage unit may be maintained at a constant resolution and with an equivalent angular field of view that is free of perspective distortion. For example, a planar area located at a depth of field that encompasses or intersects with selected portions of a storage unit, e.g., a frontal area of the storage unit, such as components of supports, panels, or other components of the storage unit, e.g., shelves or one or more other storage components such as bays, slots, bins, tables, racks, tiers, bars, hooks or cubbies, may be selected based on a focal length of an imaging device, a shift of a lens with respect to an optical axis, and a distance from the lens to the optical axis. In some implementations, the planar area may be defined based on dimensions of the storage unit, such as heights or widths of shelves or supports, and may include surfaces of the storage unit that are located at a selected distance or within the planar area. In some other implementations, such as where a storage unit includes one or more storage components other than shelves, the planar area may be defined in any other manner, such as an open or partially obstructed planar area located at a select distance from a lens, and need not include any portion of the storage unit, or any systems or components by which items may be stored, including but not limited to shelves or one or more other storage components such as bays, slots, bins, tables, racks, tiers, bars, hooks or cubbies.

Planar areas or frontal areas associated with storage units need not be aligned at vertical angles. In some implementations, a planar area or frontal area may be aligned horizontally. For example, where a storage unit is a table or another substantially horizontal surface, such as an interior surface of a cubby or bin, or a top of a shelf, a planar area or frontal area may be defined to include the table or another horizontal surface, or with respect to the table or other horizontal surface. In some implementations, an imaging device may be mounted above and in association with the table or other horizontal surface, and a lens of the imaging device may be shifted by an offset or a distance that is selected to maintain a planar area corresponding to the table or other horizontal surface at a constant resolution and with an equivalent angular field of view that is free of perspective distortion. The offset or distance may be determined based on a focal length of the imaging device, a dimension of the table (e.g., a diameter of a round table, a length or width of a rectangular table, or any other dimension of a table of any other shape) or other horizontal surface, a distance between the lens and the table or other horizontal surface.

Figure 2:
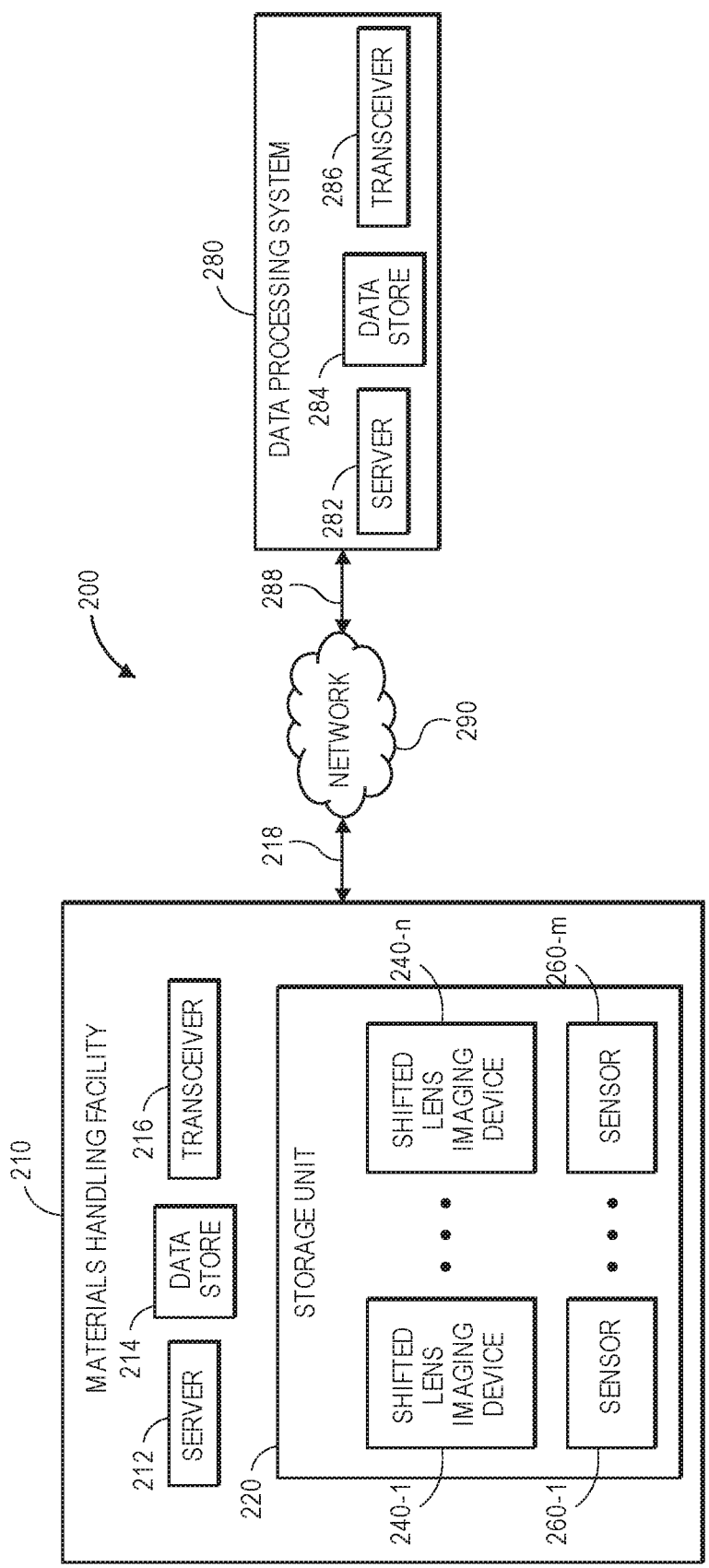
FIG. 2 is a block diagram of one system including a storage unit in accordance with implementations of the present disclosure.

Referring to FIG. 2, a block diagram of one system 200 including a storage unit in accordance with implementations of the present disclosure is shown. The system 200 of FIG. 2 includes a materials handling facility 210 and a data processing system 280 that are connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1E.

The materials handling facility 210 may be any facility for performing any number of functions of material or inventory handling, including but not limited to indoor or outdoor facilities. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

As is shown in FIG. 2, the materials handling facility 210 includes a networked computer infrastructure for performing various computer-related functions associated with the receipt, storage, processing and distribution of such items, including one or more physical computer servers 212, data stores (e.g., databases) 214 and transceivers 216, that may be provided in the same physical location as the materials handling facility 210, or in one or more alternate or virtual locations, e.g., in a "cloud"-based environment. In some implementations, the servers 212, the data stores 214 and/or the transceivers 216 or any number of other computing devices or resources may further execute any type of computer-based function or compute any type or form of calculation, including but not limited to any formulas, equations, algorithms or techniques for determining one or more probabilities or performing any number of statistical tests.

The transceiver 216 may be configured to enable the materials handling facility 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some implementations, the transceiver 216 may be configured to coordinate I/O traffic between the servers 212 and one or more onboard or external computer devices or components. The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the Universal Serial Bus (USB) standard. In some other implementations, functions of the transceiver 216 may be split into two or more separate components, or incorporated directly into the servers 212.

The servers 212, data stores (e.g., databases) 214 and/or transceivers 216 or other computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2). The materials handling facility 210 may operate one or more order processing and/or communication systems using computer devices or resources in communication with one or more of the servers 212, the data stores 214 and/or the transceivers 216, or through one or more other computing devices or resources that may be connected to the network 290, as is indicated by line 218, in order to transmit or receive information in the form of digital or analog data, or for any other purpose.

The materials handling facility 210 may include one or more inventory areas having predefined two-dimensional or three-dimensional storage units 220 for accommodating items and/or containers of such items. For example, the storage units 220 may be or include one or more aisles, rows, bays, shelves, slots, bins, tables, racks, tiers, bars, hooks, cubbies or other like storage components or systems, or any other appropriate regions or stations, which may be flat or angled, stationary or mobile, and of any shape or size.

As is also shown in FIG. 2, the materials handling facility 210 and/or the storage units 220 may include one or more imaging devices 240-1 . . . 240-n that may be mounted to the storage units 220, such as is shown in FIG. 1A, or in association with the storage units 220 in any manner, such as in any manner other than by mounting the imaging devices 240-1 . . . 240-n to the storage units 220. The imaging devices 240-1 . . . 240-n may be any form of optical recording devices that may be used to photograph or otherwise record imaging data of structures, facilities, terrain or any other elements appearing within their respective fields of view, including but not limited to one or more of the storage units 220 and/or other portions of the materials handling facility 210. The imaging devices 240-1 . . . 240-n may include lenses or other optical elements that are aligned along optical axes, or at any distance with respect to such axes, e.g., at any shift or offset therefrom. The imaging devices 240-1 . . . 240-n may include one or more sensors, memory or data storage components and processors, and such sensors, memory components or processors may further include one or more photosensitive surfaces, filters, chips, electrodes, clocks, boards, timers, power sources, connectors or any other relevant features (not shown). Such imaging devices 240-1 . . . 240-n may capture imaging data in the form of one or more still or moving images of any kind or form, as well as any relevant audio signals or other information. The imaging devices 240-1 . . . 240-n may also be adapted or otherwise configured to communicate with the data processing system 280 or any other systems or devices by way of the network 290.

Each of the imaging devices 240-1 . . . 240-n shown in FIG. 2 may include one or more optical sensors, such as one or more depth sensors or one or more visual (or RGB) sensors (e.g., color sensors, or grayscale sensors, black-and-white sensors, or other visual sensors) that are configured to capture visual imaging data (e.g., textures) or depth imaging data (e.g., ranges) to objects within one or more fields of view of the imaging devices 240-1 . . . 240-n. The depth sensors and/or visual sensors may be any sensors having single elements or a plurality of photoreceptors or photosensitive components (e.g., a CCD sensor, a CMOS sensor, or another sensor), which may be typically arranged in an array. Light reflected from objects within fields of view of the imaging devices 240-1 . . . 240-n may be captured by the depth sensors and/or visual sensors, and quantitative values, e.g., pixels, may be assigned to one or more aspects of the reflected light. The imaging devices 240-1 . . . 240-n may further include one or more illuminators or other systems such as laser systems or light-emitting diodes (or "LED") for illuminating portions of scenes appearing within fields of view of the imaging devices 240-1 . . . 240-n, e.g., by infrared or near-infrared light, such as light with wavelengths ranging from approximately seven hundred to approximately one thousand nanometers (700-1000 nm), or light having any other wavelengths.

The imaging devices 240-1 . . . 240-n may also include one or more processors, memory components or any other components (not shown) that may be required in order to capture, analyze and/or store imaging data. For example, the imaging devices 240-1 . . . 240-n may capture one or more still or moving images (e.g., streams of visual and/or depth image frames), along with any relevant audio signals or other information (e.g., position data), and may also connect to or otherwise communicate with the server 212, or any other computer devices over the network 290, through the sending and receiving of digital data. In some implementations, the imaging devices 240-1 . . . 240-n may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the server 212 or over the network 290 directly. The processors may be configured to process imaging data captured by one or more of the depth sensors or the visual sensors. For example, in some implementations, the processors may be configured to execute any type or form of machine learning tools or technique, e.g., an artificial neural network.

The imaging devices 240-1 . . . 240-n may be homogenous or heterogeneous in nature, in accordance with the present disclosure. For example, one or more of the imaging devices 240-1 . . . 240-n may have lenses that are shifted in parallel with respect to an optical sensor, e.g., shifted-lens imaging devices, while one or more of the imaging devices 240-1 . . . 240-n may have lenses that are co-aligned along an optical axis of an optical sensor, e.g., non-shifted lens imaging devices. Additionally, one or more of the imaging devices 240-1 . . . 240-n may have both a depth sensor a visual sensor. Alternatively, one or more of the imaging devices 240-1 . . . 240-n may have just a depth sensor or just a visual sensor. For example, one or more of the imaging devices 240-1 . . . 240-n may be an RGB color camera, a still camera, a motion capture/video camera or any other type or form of camera. In other implementations, one or more of the imaging devices 240-1 . . . 240-n may be depth-sensing cameras, such as an RGBD or RGBz camera. In still other implementations, one or more of the imaging devices 240-1 . . . 240-n may be a thermographic or infrared (IR) camera. Additionally, in some implementations, the imaging devices 240-1 . . . 240-n may simply be camera modules that include a lens and an image sensor configured to convert an optical image obtained using the lens of the camera into a digital signal or digital representation of the image (generally referred to herein as imaging data).

The imaging devices 240-1 . . . 240-n may also include manual or automatic features for modifying their respective fields of view or orientations. For example, one or more of the imaging devices 240-1 . . . 240-n may be configured in a fixed position, or with a fixed focal length (e.g., fixed-focus lenses) or angular orientation. Alternatively, one or more of the imaging devices 240-1 . . . 240-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 240-1 . . . 240-n, or changes in one or more of the angles defining the angular orientation.

For example, one or more of the imaging devices 240-1 . . . 240-n may be hard-mounted to a support or mounting, such as one or more of the horizontal extensions 130 shown in FIG. 1A, that maintains the device in a fixed configuration or angle with respect to one, two or three axes. Alternatively, however, one or more of the imaging devices 240-1 . . . 240-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 240-1 . . . 240-n may digitally or electronically adjust an image captured from a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine-learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The sensors 260-1 . . . 260-$m$ may be configured to detect one or more events involving the placement of items onto or the removal of items from the storage unit 220. In some implementations, one or more of the sensors 260-1 . . . 260-$m$ may be a load sensor configured to determine an extent of loading on one or more surfaces of the storage unit 220, as well as for sensing changes in such loading, e.g., by placing one or more items onto such surfaces or removing one or more items therefrom. For example, one or more of the sensors 260-1 . . . 260-$m$ may include load cells, or load transducers, for converting sensed mechanical forces into measurable electrical signals. In some implementations, such load cells may be strain-gage load cells including a plurality of strain gages that are bonded onto a beam or structural member that deforms when weight is applied thereto. In some implementations, strain in a strain gage load cell may be measured using a Wheatstone Bridge or like circuit. The strain gages included in a load cell may be configured to sense both tension and compression in the beam or structural member, and may include multiple strain gages to improve their sensitivity to load and to compensate for temperature variations within a vicinity of the load cell. When a load cell is subjected to loads, the strain of the load cell causes the electrical resistance of the strain gages to vary in proportion to the loads. In other implementations, such load cells may be compression load cells that are configured to determine an extent of compressive forces applied thereon. Such cells may be integrated into or associated with a loading surface, e.g., within the storage unit 220, or within the materials handling facility 210, or interposed between a loading surface and a support structure, e.g., a gondola.

In some other implementations, the sensors 260-1 . . . 260-$m$ may include one or more visual or depth imaging devices, in addition to the imaging devices 240-1 . . . 240-$n$, that are built into or otherwise integrated within the storage unit 220, for capturing images or other information from which one or more items or customers (or any other personnel) may be identified. In some other implementations, the sensors 260-1 . . . 260-$m$ may include one or more other contact switches, ranging sensors (e.g., radar or LIDAR), bar code scanners, radiofrequency identification (or "RFID") transmitters or readers, presence detection sensors, motion sensors, or others.

In addition to the imaging devices 240-1 . . . 240-$n$ and the sensors 260-1 . . . 260-$m$, the materials handling facility 210 may also include any number of other sensors, components or other features for controlling or aiding in the operation of the materials handling facility 210 or the storage unit 220, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

Although the system 200 of FIG. 2 includes a single box corresponding to the storage unit 220, two boxes corresponding to the imaging devices 240-1 . . . 240-$n$, and two boxes corresponding to the sensors 260-1 . . . 260-$m$, those of ordinary skill in the pertinent arts will recognize that any number or type of storage units, imaging devices or load sensors may be operated in accordance with the present disclosure. In some implementations, the system 200 may include dozens or even hundreds of imaging devices and/or sensors of any type or form.

The data processing system 280 includes one or more physical computer servers 282 having one or more data stores 284 (e.g., databases) and transceivers 286 associated therewith, as well as provided for any specific or general purpose. For example, the data processing system 280 of FIG. 2 may be independently provided for the exclusive purpose of receiving, analyzing or storing imaging data or other information or data received from the imaging devices 240-1 . . . 240-$n$ or the sensors 260-1 . . . 260-$m$, or, alternatively, provided in connection with one or more physical or virtual services that are configured to receive, analyze or store such imaging data or other information or data, as well as one or more other functions. In some implementations, the data processing system 280 may be associated with a materials handling facility, or any other physical or virtual facility.

The servers 282 may be connected to or otherwise communicate with the data stores 284, which may store any type of information or data, including but not limited to acoustic signals, information or data relating to imaging data, or information or data regarding environmental conditions, operational characteristics, or positions, for any purpose. The servers 282, the computer data stores 284 and/or the transceivers 286 may also connect to or otherwise communicate with the network 290, as indicated by line 288, through the sending and receiving of digital data. For example, the data processing system 280 may include any facilities, stations or locations having the ability or capacity to receive and store information or data, such as media files, in one or more data stores, e.g., media files received from the imaging devices 240-1 . . . 240-$n$, or the sensors 260-1 . . . 260-$m$, or from one or more other external computer systems (not shown) via the network 290. In some implementations, the data processing system 280 may be provided in a physical location. In other such implementations, the data processing system 280 may be provided in one or more alternate or virtual locations, e.g., in a "cloud"-based environment. In still other implementations, the data processing system 280 may be provided onboard one or more vehicles, e.g., an unmanned aerial vehicle.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network.

Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The materials handling facility 210 and/or the data processing system 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the materials handling facility 210 and/or the data processing system 280 may be adapted to transmit information or data in the form of synchronous or asynchronous messages between one another or to any other computer device in real time or in near-real time, or in one or more offline processes, via the network 290. Those of ordinary skill in the pertinent art would recognize that the materials handling facility 210 and/or the data processing system 280 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 282, or any other computers or control systems utilized by the imaging devices 240-1 . . . 240-n, the sensors 260-1 . . . 260-m or the data processing system 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, some implementations of the present disclosure include storage units having shifted-lens imaging devices that are mounted thereto and aligned to include frontal areas within their fields of view. Referring to FIGS. 3A through 3D, views of aspects of one storage unit in accordance with implementations of the present disclosure are shown. Except where otherwise noted, reference numerals preceded by the number "3" shown in FIGS. 3A through 3D indicate components or features that are similar to components or features having reference numerals preceded by the number "2" shown in FIG. 2, or by the number "1" shown in FIGS. 1A through 1E.

Figure 3A:
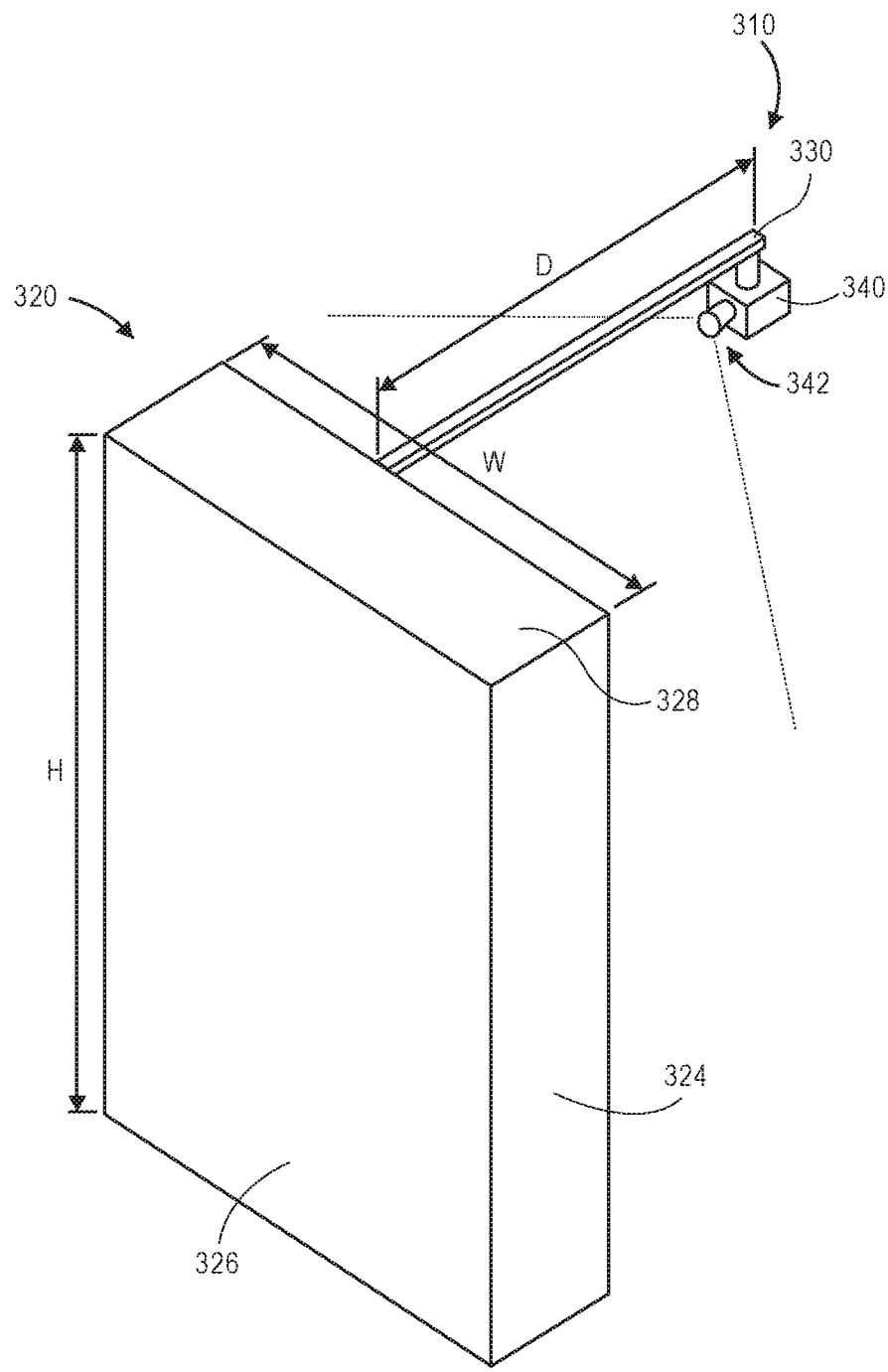
Figure 3B:
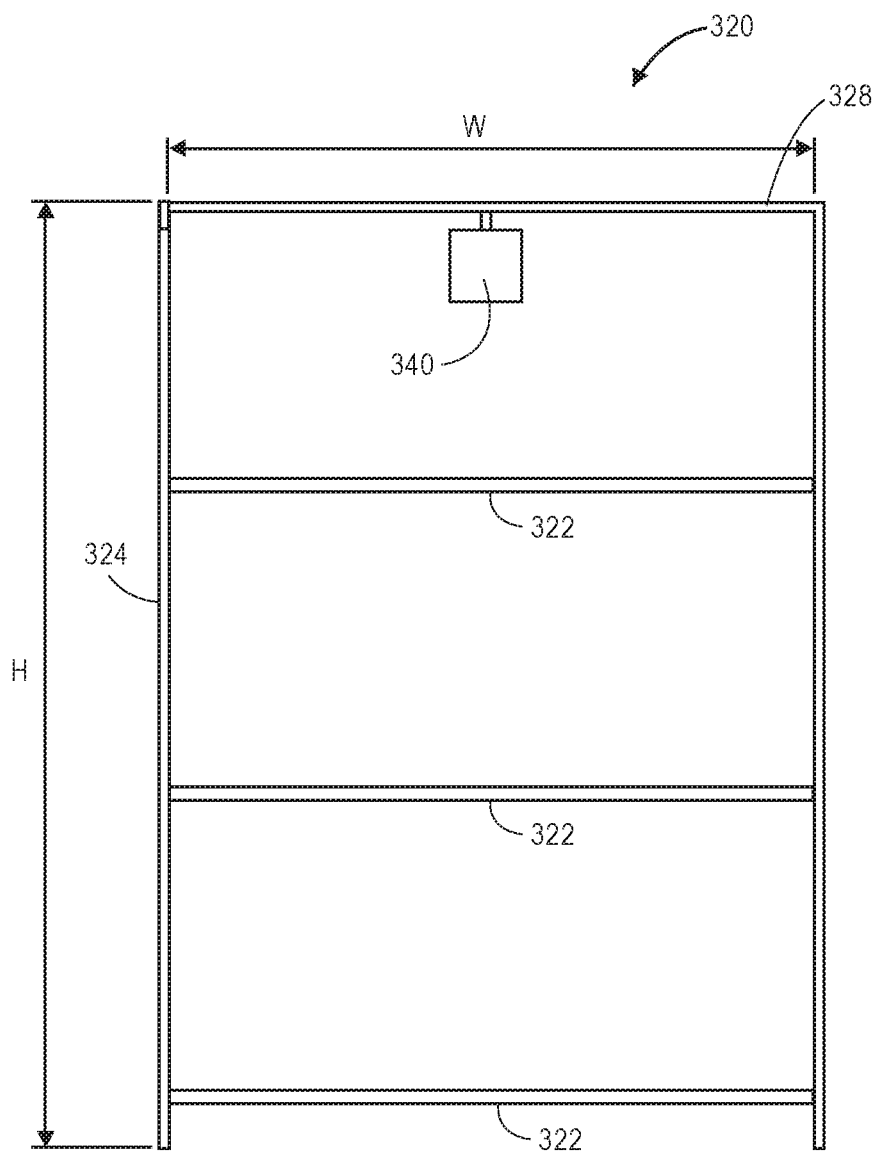
Figure 3C:
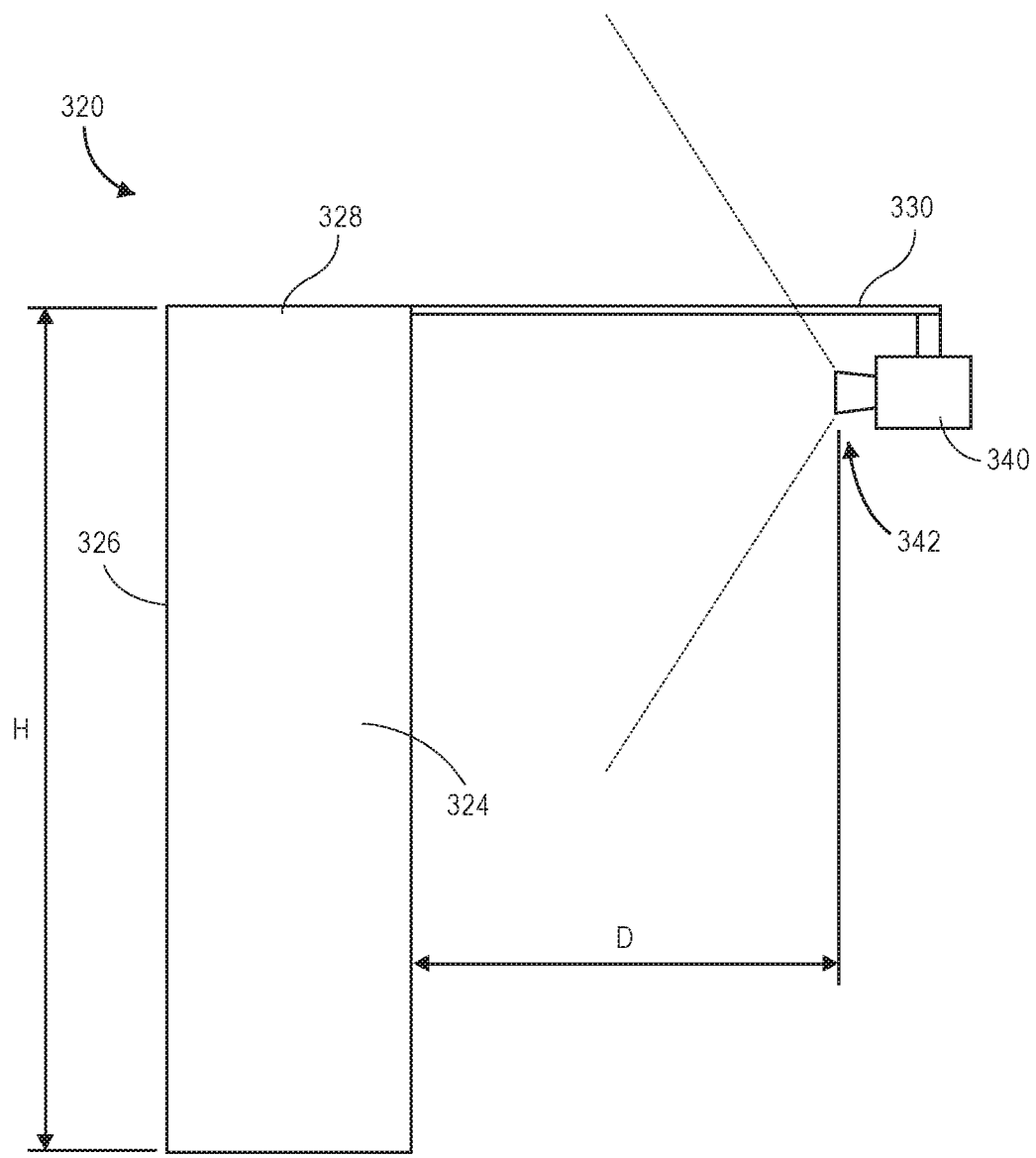

FIG. 3A is a rear perspective view of a storage unit 320. FIG. 3B is a front view of the storage unit 320. FIG. 3C is a side view of the storage unit 320. FIG. 3D is a top view of the storage unit 320.

The storage unit 320 is in the form of a frame having a plurality of shelves 322, a pair of supports 324, a back panel 326 and a top panel 328. The shelves 322 may be supported by the back panel 326, e.g., in a cantilevered manner, or by the supports 324, e.g., at either ends of the shelves 322. Additionally, the storage unit 320 further includes a pair of elongated extensions 330 that are mounted to the supports 324 or the top panel 328 at proximal ends. The storage unit 320 also includes an imaging device 340 mounted substantially centrally with respect to the supports 324, e.g., to the top panel 328 approximately halfway between the supports 324, by an extension 330. Although the storage unit 320 is shown with the supports 324 being vertically oriented, and the shelves 322 being horizontally oriented, storage units of the present disclosure may include supports and/or shelves or other storage elements that are provided or aligned at any angle with respect to one another.

The imaging device 340 is oriented to include a planar area or frontal area of the storage unit 320 within its field of view. The imaging device 340 includes a lens 342 that is shifted with respect to an optical axis by a distance (e.g., an offset) that may be selected based on a distance between the lens and an image sensor (e.g., a focal length), a distance between the lens and a storage unit, or dimensions (e.g., heights or widths) of the storage unit 320. In some implementations, two or more of the imaging devices 340 may be provided. In such implementations, the imaging devices 340 may be mounted to or in association with the storage unit 320 in a configuration that ensures that a sufficient overlap is obtained between the imaging devices 340. Additionally, in some implementations, a single imaging device 340 may include planar areas or frontal areas of any number of storage units 320 within its field of view.

For example, as is shown in FIGS. 3A through 3D, the imaging device 340 is provided at a distance D from a front face of the storage unit 320. Additionally, the storage unit 320 has a height H and a width W, thereby defining a frame having a frontal area of the storage unit 320 having dimensions of H×W. The distance by which the lens 342 is shifted with respect to the optical axis of the imaging device 340 may be selected based on a focal length of the imaging devices 340, in order to maintain the frontal area of the storage unit 320 within the field of view of the imaging device 340.

In some implementations, the storage unit 320 may further include one or more sensors (e.g., load sensors, RFID sensors, or any other sensors) for detecting the presence of one or more items thereon, or for detecting the placement of such items or the removal of such items therefrom. For example, where the storage unit 320 includes one or more load sensors, the placement of an item on one of the shelves 322, or the removal of an item from one of the shelves 322, may be detected based on changes in loading as determined by one or more of the load sensors. In some implementations, a mass corresponding to a change in loading on one of the shelves 322 that is determined by such load sensors may be calculated, and one or more items associated with the change in loading may be identified based on the mass. In some implementations, a location of the change in loading may be determined according to standard equilibrium principles. Furthermore, where the storage unit 320 includes one or more RFID sensors, the placement of an item on one of the shelves 322 may be detected based on the presence of a unique RFID signal transmitted by an RFID tag or other device associated with that item. Conversely, the removal of an item from one of the shelves 322 may be detected based on the absence or loss of the unique RFID signal. Where the storage unit 320 includes one or more LIDAR sensors, a location at which an item is placed on one of the shelves 322 or removed from one of the shelves 322 may be determined based on returns or reflections received from objects, such as a hand or the item, from such locations.

In some implementations, the storage unit 320 need not include any shelves 322. For example, the storage unit 320 may be a locker-type system having an available volume defined by the supports 324, the back panel 326 and the top panel 328, or in any other manner. A planar area or frontal area may be selected or defined based on any aspects or features of the storage unit 320. In some implementations, the storage unit 320 may include any number of bays, slots, bins, tables, racks, tiers, bars, hooks, or cubbies, or other systems for storing one or more items of any number or type, and is not required to include any number of shelves. Additionally, the storage unit 320 need not include any vertical supports, top panels, back panels or bottom panels. The imaging device 340 may be configured with one or more lenses that are shifted with respect to their optical axes and aligned to maintain the planar area or frontal area of the storage unit 320 within their respective fields of view, regardless of the manner or features by which the storage unit 320 was constructed, or a number or type of items stored therein.

The imaging device 340 may be operated in any manner and subject to any constraints. For example, in some implementations, the imaging device 340 may be programmed or configured to continuously capture imaging data, and the imaging data captured thereby may be processed according to one or more algorithms or techniques to identify items that are associated with interactions with the storage unit 320, according to one or more object detection or recognition algorithms or techniques (e.g., any type or form of machine learning tools or technique, such as an artificial neural network). Alternatively, in some implementations, the operation of the imaging device 340 or the processing of imaging data captured thereby may be initiated or controlled based on information or data regarding changes in loading on one or more of the shelves 322, e.g., or information or data determined by any other sensors (not shown). For example, where imaging data is captured continuously using the imaging device 340, and a change in loading on one of the shelves 322 is detected at a given time, thereby implying that an item has been placed on or removed from the one of the shelves 322, imaging data captured over a period of time including the given time may be processed, e.g., according to the one or more object detection or recognition algorithms or techniques, in order to identify the item associated with the change in loading. Alternatively, the operation of the imaging device 340, or the processing of imaging data captured thereby, may be controlled in any other manner and on any basis.

Figure 4A:
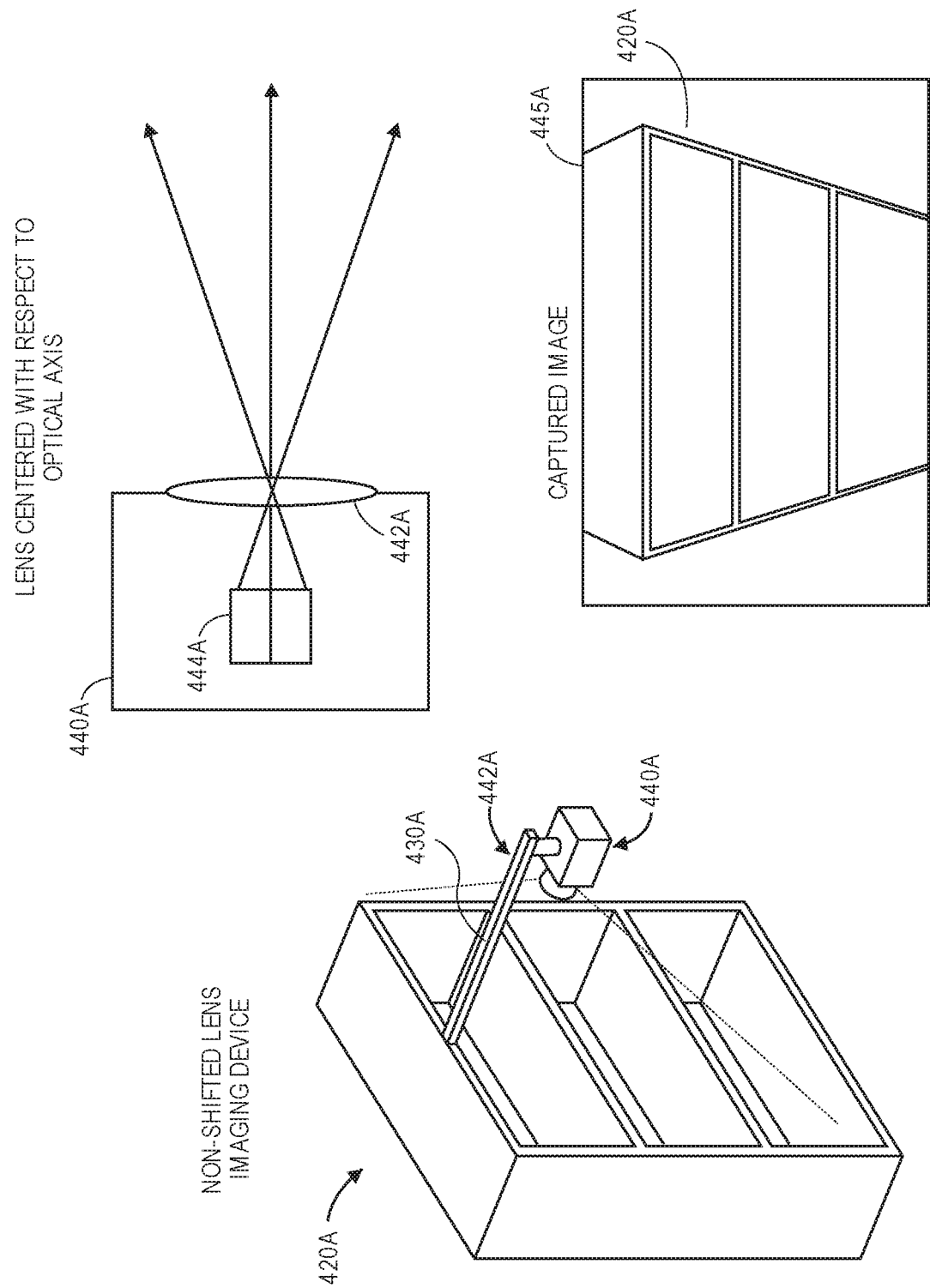
FIGS. 4A and 4B are views of aspects of storage units in accordance with implementations of the present disclosure.
Figure 4B:
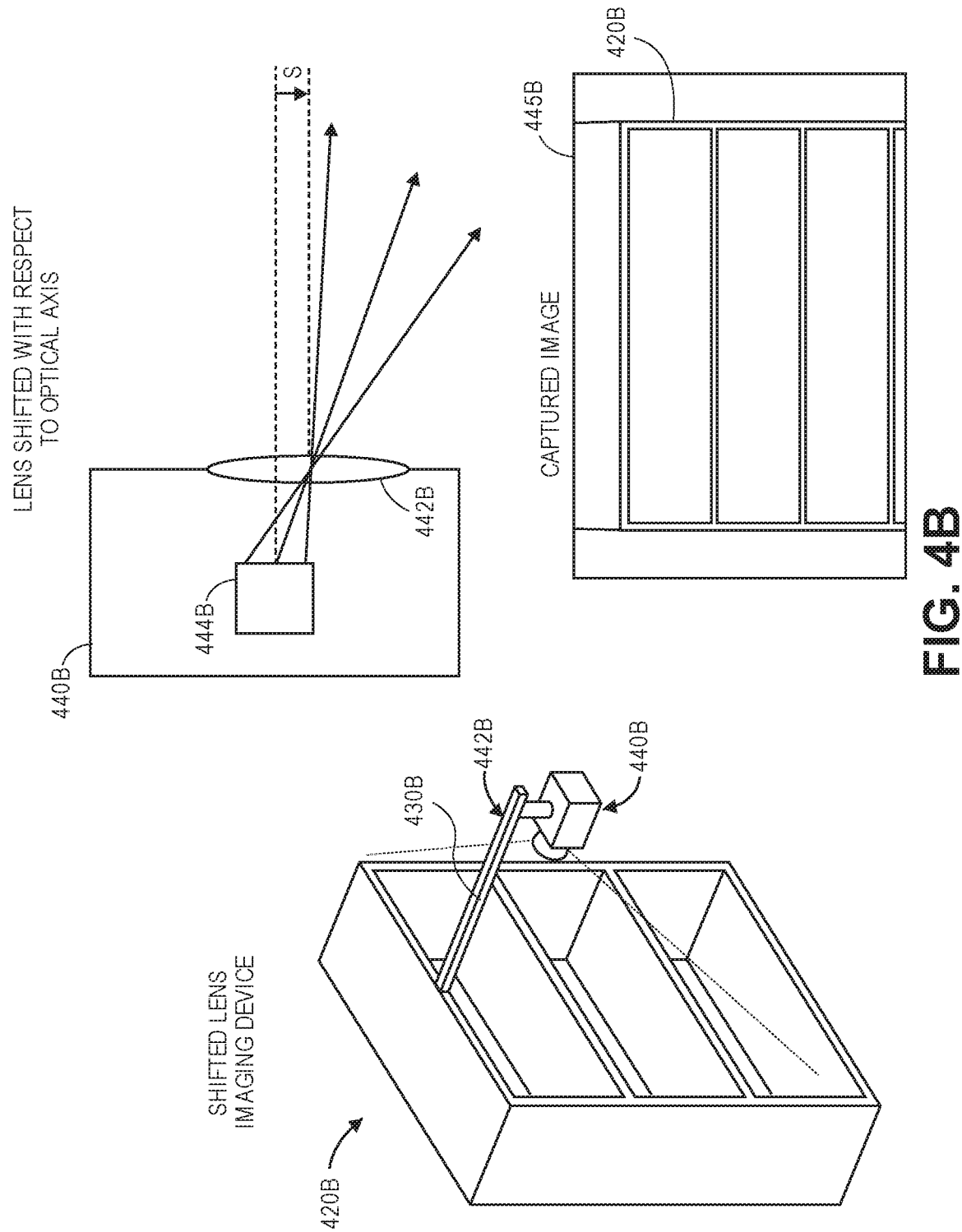

As is discussed above, by providing imaging devices having lenses that are shifted with respect to optical axes in association with a storage unit, perspective distortion within imaging data captured using the imaging devices may be reduced or eliminated. Referring to FIGS. 4A and 4B, views of aspects of storage units in accordance with implementations of the present disclosure are shown. Except where otherwise noted, reference numerals preceded by the number "4" shown in FIGS. 4A and 4B indicate components or features that are similar to components or features having reference numerals preceded by the number "3" shown in FIGS. 3A through 3D, by the number "2" shown in FIG. 2, or by the number "1" shown in FIGS. 1A through 1E.

As is shown in FIG. 4A, a storage unit 420A includes an extension 430A mounted to an upper surface or portion of the storage unit 420A, and an imaging device 440A mounted to a distal end of the extension 430A. The imaging device 440A includes a lens 442A that is centered with respect to an optical axis of an optical sensor 444A, e.g., a visual sensor such as a color, a grayscale or a black-and-white sensor, or a depth sensor. Because the imaging device 440A is mounted to the upper surface or portion of the storage unit 420A, and the lens 442A is centered with respect to the optical axis, an image 445A of the storage unit 420A captured using the imaging device 440A is distorted based on its perspective, such that portions of the storage unit 420A that are nearest the imaging device 440A are depicted more prominently within the image 445A, e.g., larger and at higher levels of resolution, and portions of the storage unit 420A that are farthest from the imaging device 440A are depicted less prominently within the image 445A, e.g., smaller and at lower levels of resolution.

As is shown in FIG. 4B, a storage unit 420B includes an extension 430B mounted to an upper surface or portion of the storage unit 420B, and an imaging device 440B mounted to a distal end of the extension 430B. The imaging device 440B includes a lens 442B that is shifted or offset with respect to an optical axis of an optical sensor 444B, e.g., a visual sensor such as a color, a grayscale or a black-and-white sensor, or a depth sensor. Despite the fact that the imaging device 440B is mounted to the upper surface or portion of the storage unit 420B, an image 445B of the storage unit 420B captured using the imaging device 440B is free of distortions, and has a constant resolution across a planar area or frontal area of the storage unit 420B, e.g., with an equivalent angular field of view that is free of perspective distortion on the fronto-parallel plane.

Figure 5:
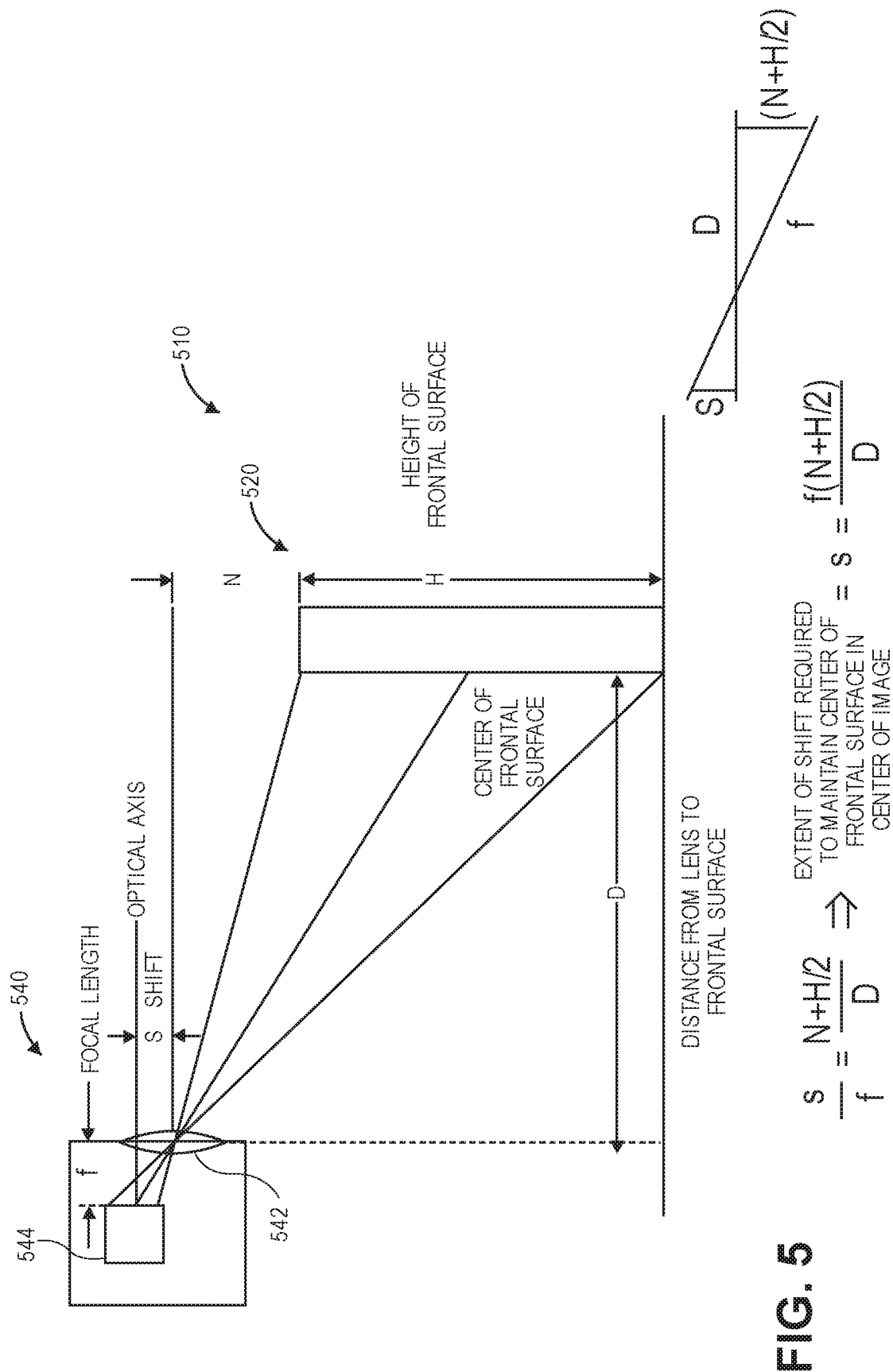
FIG. 5 is a view of aspects of one system having a storage unit in accordance with implementations of the present disclosure.

As is discussed above, distances by which lenses are to be shifted within a shifted-lens imaging device may be selected based on a focal length of the imaging device, or on dimensions of a storage unit to be included within a field of view of the imaging device, as well as a position of the imaging device with respect to the storage unit. Referring to FIG. 5, a view of aspects of one system having a storage unit in accordance with implementations of the present disclosure is shown. Except where otherwise noted, reference numerals preceded by the number "5" shown in FIG. 5 indicate components or features that are similar to components or features having reference numerals preceded by the number "4" shown in FIGS. 4A and 4B, by the number "3" shown in FIGS. 3A through 3D, by the number "2" shown in FIG. 2, or by the number "1" shown in FIGS. 1A through 1E.

As is shown in FIG. 5, a portion of a materials handling facility includes a storage unit 520 and an imaging device 540. The storage unit 520 is provided at a distance D from the imaging device 540, and includes a frontal area having a height H. The imaging device 540 has a lens 542 that is provided at a focal length f from an image sensor 544, and mounted at an elevation N above the frontal area of the storage unit 520.

An offset (or distance) S by which the lens 542 is to be shifted with respect to an optical axis of the image sensor 544 may be determined according to relationships of similar triangles. For example, and as is shown in FIG. 5, where the imaging device 540 is to be configured to maintain a center of the storage unit 520 within a center of an image captured by the imaging device 540, a ratio of the offset S to the focal length f is equal to a ratio of the elevation N plus one-half of the height H (e.g., a height corresponding to a center of the frontal area) of the storage unit 520 to the distance D between the lens 542 and the storage unit 520. Therefore, the extent of the shift required to maintain the center of the frontal area of the storage unit 520 within a center of an image, or the offset S, is equal to a product of the focal length f and a sum of the elevation N and one-half the height H divided by the distance D, or $S=f\cdot(N+H/2)/D$. Where the lens 542 of the imaging device 540 is aligned with respect to a top of the frontal area, e.g., at the height H, the elevation N is zero, and the extent of the shift required to maintain the center of the frontal area of the storage unit 520 within a center of an image is equal to a product of the focal length f and the height H divided by twice the distance D, or $S=f\cdot H/2D$.

Figure 6:
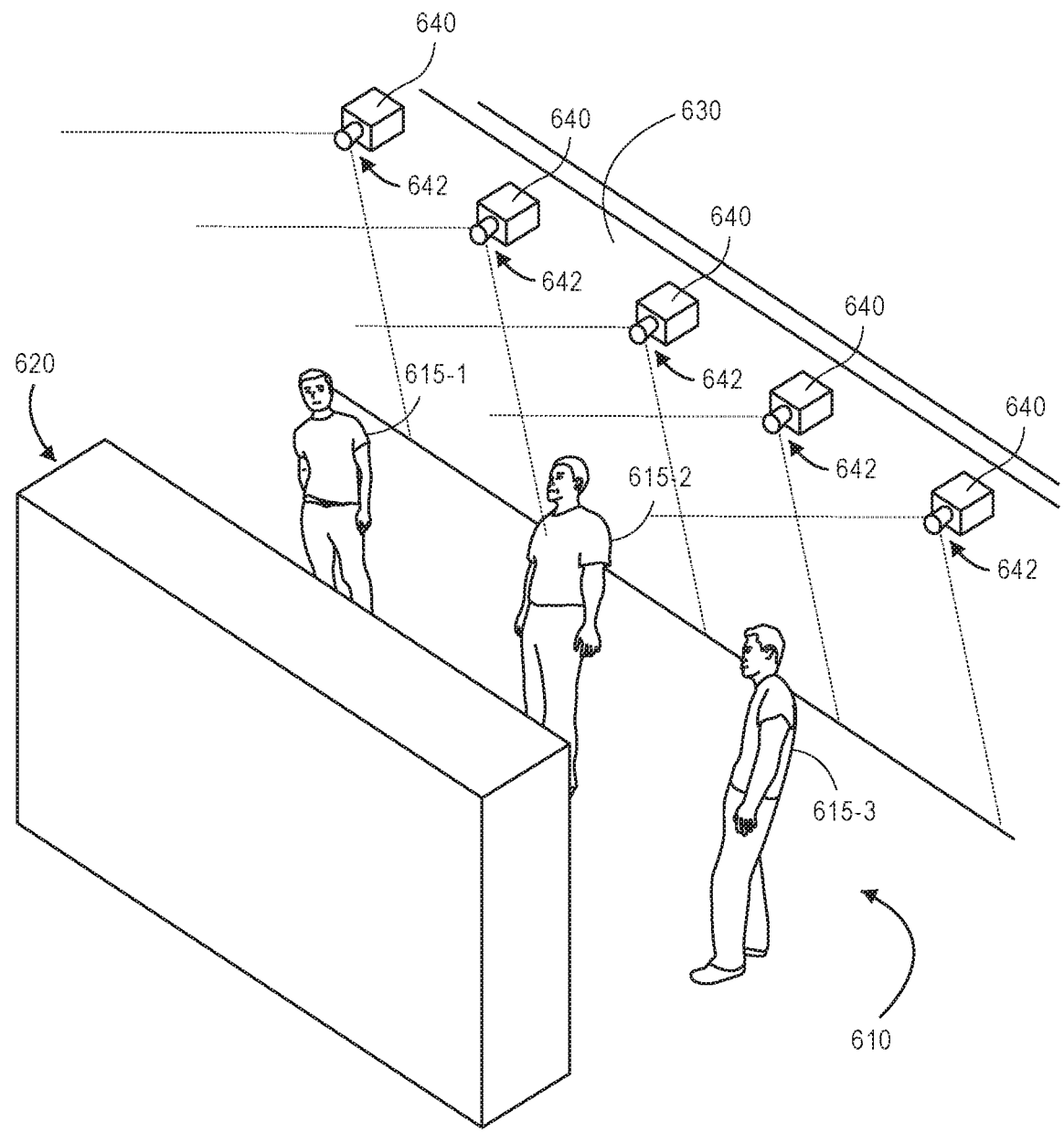
FIG. 6 is a view of aspects of one system having a storage unit in accordance with implementations of the present disclosure.

Shifted-lens imaging devices that are provided in association with a storage unit need not be mounted directly to the storage unit in accordance with the present disclosure. Referring to FIG. 6, a view of aspects of one system having a storage unit in accordance with implementations of the present disclosure is shown. Except where otherwise noted, reference numerals preceded by the number "6" shown in FIG. 6 indicate components or features that are similar to components or features having reference numerals preceded by the number "5" shown in FIG. 5, by the number "4" shown in FIGS. 4A and 4B, by the number "3" shown in FIGS. 3A through 3D, by the number "2" shown in FIG. 2, or by the number "1" shown in FIGS. 1A through 1E.

As is shown in FIG. 6, a portion of a materials handling facility 610 including one or more storage units 620 is shown. Additionally, the portion of the materials handling facility 610 further includes a wall 630 opposing a planar area or frontal area of the storage units 620, with a plurality of imaging devices 640 mounted to the wall 630, e.g., at elevated heights with respect to the storage units 620. Each of the imaging devices 640 includes a lens 642 that is shifted with respect to optical axes of one of the imaging devices 640, e.g., by an offset or distance that may be selected based on a focal length of the imaging device and a distance between the imaging device and dimensions of the frontal viewing area of the storage units 620. The imaging devices 640 may be configured to capture imaging data regarding interactions by one or more customers 615-1, 615-2, 615-3 or other personnel with the storage units 620, e.g., interactions in which the one or more customers 615-1, 615-2, 615-3 retrieve items from the storage units 620, or place items on the storage units 620, or any other interactions.

Although some of the implementations disclosed herein reference the use of shifted-lens imaging devices in materials handling facilities or like environments, those of ordinary skill in the pertinent arts will recognize that the systems and methods disclosed herein are not limited for use in materials handling facilities, and may be utilized in connection with any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to any methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A storage unit comprising:
a first support member having a height;
a second support member having the height, wherein the second support member is aligned substantially parallel to the first support member;
a plurality of shelves, wherein each of the shelves has a width, and wherein each of the shelves extends between the first support member and the second support member;
a first extension having a first proximal end coupled to the first support member, wherein the first extension is substantially normal to the first support member;
a second extension having a second proximal end coupled to the second support member, wherein the second extension is substantially normal to the second support member;
a first imaging device coupled to a distal end of the first extension, wherein the first imaging device comprises a first lens and a first optical sensor, wherein the first imaging device is aligned to include at least a frontal area of the storage unit defined by the height and the width within a first field of view, and wherein the first lens is aligned at a first offset from a first optical axis of the first optical sensor; and
a second imaging device coupled to a second distal end of the second extension, wherein the second imaging device comprises a second lens and a second optical sensor, wherein the second imaging device is aligned to include at least the frontal area of the storage unit within a second field of view, wherein the second lens is aligned at a second offset from a second optical axis of the second optical sensor, and wherein the second field of view overlaps the first field of view at least in part.

2. A storage unit comprising:
a first support member having a height;
a second support member having the height, wherein the second support member is aligned substantially parallel to the first support member;
a plurality of shelves, wherein each of the shelves has a width, and wherein each of the shelves extends between the first support member and the second support member;
a first extension having a first proximal end coupled to the first support member, wherein the first extension is substantially normal to the first support member; and
a first imaging device coupled to a distal end of the first extension,
wherein the first imaging device comprises a first lens and a first optical sensor,
wherein the first imaging device is aligned to include at least a frontal area of the storage unit defined by the height and the width within a first field of view,
wherein the first lens is aligned at a first offset from a first optical axis of the first optical sensor,
wherein the frontal area is provided at a distance from the first lens, and
wherein the first offset is equal to a product of a first focal length of the first imaging device and the height, divided by twice the first distance.

3. The storage unit of claim 1, wherein the first imaging device further comprises at least one processor and at least one memory component having stored thereon executable instructions that, as a result of being executed by the at least one processor, causes the first imaging device to at least:
receive a first plurality of images from the first imaging device;
provide an input to an artificial neural network operated by the server, wherein the input comprises at least one of the first plurality of images, and wherein the artificial neural network is configured to detect one or more items within imaging data;
receive an output from the artificial neural network;
detect at least a first item based at least in part on the output; and
associate the first item with at least one person.

4. The storage unit of claim 2, further comprising:
a second extension having a second proximal end coupled to the second support member, wherein the second extension is substantially normal to the second support member; and
a second imaging device coupled to a second distal end of the second extension, wherein the second imaging device comprises a second lens and a second optical sensor, wherein the second imaging device is aligned to include at least the frontal area of the storage unit within a second field of view, wherein the second lens is aligned at a second offset from a second optical axis of the second optical sensor, and wherein the second field of view overlaps the first field of view at least in part.

5. A system comprising:
a storage unit comprising:
at least one support; and
at least one storage component provided in association with the at least one support; and
at least a first imaging device, wherein the first imaging device comprises a first lens aligned parallel to a first optical sensor and at a first offset with respect to a first optical axis defined by the first optical sensor,
wherein a planar area of interest associated with the storage unit including at least a portion of the at least one storage component is located within a first field of view of the first imaging device,
wherein the planar area of interest is at a first distance from the first lens, and
wherein the first offset is defined based at least in part on the first distance and at least one dimension of the planar area of interest.

6. The system of claim 5, wherein the at least one support comprises a first support and a second support aligned parallel to one another, wherein the at least one storage component comprises a plurality of shelves extending between the first support and the second support, and wherein the storage unit further comprises a first extension having a first proximal end coupled to the first support and a first distal end coupled to the first imaging device.

7. A system comprising:
a storage unit comprising:
a first support;
a second support aligned in parallel with the first support;
a plurality of shelves extending between the first support and the second support;
a first extension having a first proximal end coupled to the first support;
a second extension having a second proximal end coupled to the second support;
a first imaging device coupled to a first distal end of the first extension, wherein the first imaging device comprises a first lens aligned parallel to a first optical sensor and at a first offset with respect to a first optical axis defined by the first optical sensor; and
a second imaging device coupled to a second distal end of the second extension, wherein the second imaging device comprises a second lens aligned parallel to a second optical sensor and at a second offset with respect to a second optical axis defined by the second optical sensor,
wherein a planar area of interest associated with the plurality of shelves is within a first field of view of the first imaging device and a second field of view of the second imaging device.

8. The system of claim 5, wherein the at least one support has a first height,
wherein the at least one storage component has a first width, and
wherein the planar area of interest is defined by the first height and the first width.

9. The system of claim 7, wherein the planar area of interest is at a first distance from the first lens, and
wherein the first offset is defined based at least in part on the first distance and at least one dimension of the planar area of interest.

10. The system of claim 5, wherein the first imaging device further comprises at least a first processor and at least a first memory component programmed with one or more instructions, and
wherein the first processor, upon executing the one or more instructions, causes the first imaging device to at least:
capture a first plurality of images;
provide an input to a machine learning tool operated by at least the first processor, wherein the input comprises at least one of the first plurality of images, and wherein the machine learning tool is configured to detect one or more items within the at least one of the first plurality of images;
receive an output from the machine learning tool;
detect at least a first item based at least in part on the output; and
associate the first item with at least one person.

11. The system of claim 10, wherein the machine learning tool is further configured to detect one or more aspects of a human within imaging data.

12. The system of claim 11, wherein the first processor, upon executing the one or more instructions, further causes the first imaging device to at least:

determine that a plurality of persons are within a vicinity of the storage unit, wherein the at least one person is one of the plurality of persons;
select one of the plurality of persons based at least in part on the output, wherein the at least one person is the selected one of the plurality of persons; and
associate the first item with the at least one person based at least in part on the output.

13. The system of claim 5, wherein the first imaging device is in communication with at least one computer device configured to at least:
receive a first plurality of images from the first imaging device;
provide an input to a machine learning tool operated by the at least one computer device, wherein the input comprises at least one of the first plurality of images, and wherein the machine learning tool is configured to detect one or more items within the at least one of the first plurality of images;
receive an output from the machine learning tool;
detect at least a first item based at least in part on the output; and
associate the first item with at least one person.

14. The system of claim 13, further comprising at least one weight sensor associated with the at least one storage component and the at least one support, wherein the at least one weight sensor is configured to measure a load on at least a portion of the at least one storage component,
wherein the at least one weight sensor is in communication with the at least one computer device, and
wherein the at least one computer device is further configured to at least:
detect a first load on the portion of the at least one storage component prior to a first time;
detect a second load on the portion of the at least one storage component at the first time;
identify the first item based at least in part on a difference between the first load and the second load; and
identify at least a first image of the first plurality of images captured at the first time,
wherein the input comprises the first image.

15. The system of claim 5, wherein the at least one storage compartment comprises a table, and
wherein the planar area of interest is substantially horizontal.

16. The system of claim 5, wherein the at least one storage component comprises at least one of a bay, a slot, a bin, a rack, a bar, a hook or a cubby.

17. The system of claim 5, wherein the storage unit is provided in a facility having at least one of a wall or a ceiling, and
wherein the first imaging device is mounted to the at least one of the wall or the ceiling.

18. A method comprising:
capturing a first image by a first imaging device,
wherein the first imaging device comprises a first lens and a first optical sensor,
wherein the first lens is aligned parallel to the first optical sensor and at a first offset from a first optical axis defined by the first optical sensor,
wherein a first field of view of the first imaging device includes a planar area of interest associated with a storage unit,
wherein the storage unit comprises a first support, a second support aligned parallel to the first support, a plurality of shelves extending between the first support and the second support, and a first extension having a first proximal end coupled to the first support and a first distal end coupled to the first imaging device,
wherein the planar area of interest is provided at a first distance from the first lens,
wherein the planar area of interest has a first dimension, and
wherein the first offset is equal to a product of a first focal length of the first imaging device and the first dimension, divided by twice the first distance;
providing at least one input to an artificial neural network, wherein the at least one input comprises the first image, and wherein the artificial neural network is trained to detect at least one item within the first image;
receiving at least one output from the artificial neural network based at least in part on the at least one input;
detecting a first item within the first image based at least in part on the at least one output; and
associating the first item with at least a first person.

19. The method of claim 18, wherein the artificial neural network is further trained to detect one or more aspects of a human within imaging data, and
wherein the method further comprises:
determining that a plurality of persons are within a vicinity of the storage unit, wherein the first person is one of the plurality of persons;
selecting one of the plurality of persons based at least in part on the at least one output, wherein the first person is the selected one of the plurality of persons; and
associating the first item with the first person based at least in part on the at least one output.

20. The storage unit of claim 1, wherein the frontal area is provided at a distance from the first lens, and
wherein the first offset is equal to a product of a first focal length of the first imaging device and the height, divided by twice the first distance.

* * * * *